United States Patent
Grieu et al.

(10) Patent No.: US 7,370,203 B1
(45) Date of Patent: May 6, 2008

(54) METHOD FOR INDIVISIBLY MODIFYING A PLURALITY OF SITES IN A MICROCIRCUIT CARD NON VOLATILE MEMORY, IN PARTICULAR A CONTACTLESS CARD

(75) Inventors: Francois Grieu, Paris (FR); Stéphane Didier, Paris (FR)

(73) Assignee: La Regie Autonome des Transports Parisiens, Paris (FR)

( * ) Notice: Subject to any disclaimer, the term of this patent is extended or adjusted under 35 U.S.C. 154(b) by 0 days.

(21) Appl. No.: 09/673,106

(22) PCT Filed: Apr. 9, 1999

(86) PCT No.: PCT/FR99/00837

§ 371 (c)(1),
(2), (4) Date: Nov. 28, 2000

(87) PCT Pub. No.: WO99/53451

PCT Pub. Date: Oct. 21, 1999

(30) Foreign Application Priority Data

Apr. 9, 1998 (FR) .................................. 98 04453

(51) Int. Cl.
*H04L 9/00* (2006.01)
*G06F 17/30* (2006.01)
*G06F 12/14* (2006.01)
*G06F 11/00* (2006.01)
*G06F 12/00* (2006.01)

(52) U.S. Cl. .................... 713/172; 713/193; 726/9; 726/20; 705/64; 705/65; 705/66; 705/68; 705/75; 714/15; 714/19; 714/21; 707/202; 707/203; 902/38

(58) Field of Classification Search ................ 713/72, 713/73, 200, 201, 193; 705/64–66, 67, 68, 705/75; 726/9, 20; 714/15, 19, 21; 707/202, 707/203; 902/38
See application file for complete search history.

(56) References Cited

U.S. PATENT DOCUMENTS

| | | | | |
|---|---|---|---|---|
| 4,877,945 A | | 10/1989 | Fujisaki | |
| 4,885,788 A | * | 12/1989 | Takaragi et al. ........... | 705/67 |
| 5,453,601 A | * | 9/1995 | Rosen ....................... | 705/65 |
| 5,455,407 A | * | 10/1995 | Rosen ....................... | 705/69 |
| 5,701,343 A | * | 12/1997 | Takashima et al. ........ | 705/51 |
| 5,739,511 A | * | 4/1998 | Pedersen ................... | 235/380 |
| 5,761,309 A | * | 6/1998 | Ohashi et al. ............. | 713/156 |
| 5,799,087 A | * | 8/1998 | Rosen ....................... | 705/69 |
| 5,805,712 A | * | 9/1998 | Davis ........................ | 713/173 |
| 5,812,762 A | * | 9/1998 | Kim .......................... | 713/200 |
| 5,825,875 A | * | 10/1998 | Ugon ........................ | 705/65 |
| 5,856,659 A | * | 1/1999 | Drupsteen et al. ......... | 235/380 |
| 5,857,024 A | * | 1/1999 | Nishino et al. ............ | 713/172 |
| 5,869,825 A | * | 2/1999 | Ziarno ....................... | 235/380 |
| 5,892,902 A | * | 4/1999 | Clark ......................... | 713/201 |
| 5,920,629 A | * | 7/1999 | Rosen ....................... | 705/69 |
| 5,953,423 A | * | 9/1999 | Rosen ....................... | 705/65 |
| 5,963,648 A | * | 10/1999 | Rosen ....................... | 705/67 |
| 6,047,067 A | * | 4/2000 | Rosen ....................... | 705/68 |
| 6,062,472 A | * | 5/2000 | Cheung ..................... | 235/380 |
| 6,088,797 A | * | 7/2000 | Rosen ....................... | 713/173 |
| 6,122,625 A | * | 9/2000 | Rosen ....................... | 705/65 |
| 6,178,507 B1 | * | 1/2001 | Vanstone ................... | 713/169 |
| 6,205,436 B1 | * | 3/2001 | Rosen ....................... | 705/65 |
| 6,216,227 B1 | * | 4/2001 | Goldstein et al. .......... | 713/172 |
| 6,477,511 B1 | * | 11/2002 | Guenther .................. | 705/60 |
| 6,848,049 B1 | * | 1/2005 | Tailliet ...................... | 713/168 |
| 6,851,607 B2 | * | 2/2005 | Orus et al. ................. | 235/380 |
| 6,868,408 B1 | * | 3/2005 | Rosen ....................... | 705/64 |
| 7,028,187 B1 | * | 4/2006 | Rosen ....................... | 713/175 |

FOREIGN PATENT DOCUMENTS

| | | |
|---|---|---|
| DE | 44 39 266 A | 4/1996 |
| EP | 0 700 023 | 3/1996 |
| EP | 0 740 268 | 10/1996 |
| FR | 2 689 662 | 10/1993 |
| FR | 2 701 578 | 8/1994 |
| FR | 2 757 661 | 6/1998 |
| WO | 89 02140 A | 3/1989 |

OTHER PUBLICATIONS

Anonymous, Secure Computing Announces the Future of Network Security, Mar. 1998, PR Newswire, p. 1.*
Sun, Hung-Min, An Efficient Remote Use Authentication Scheme Using Smart Cards, 2000, IEEE, pp. 958-961.*

\* cited by examiner

*Primary Examiner*—Christopher Revak
*Assistant Examiner*—Aravind K Moorthy
(74) *Attorney, Agent, or Firm*—Nixon & Vanderhye P.C.

(57) ABSTRACT

A method of connecting a card to a terminal including the following steps: a) on receiving corresponding respective commands from the terminal, it modifies the contents of the card memory by provisionally recording in the card memory each of said interdependent items of information without losing prior values corresponding to said items; and then b) the modifications are finalized either by all of them being confirmed or by all of them being discarded.

29 Claims, No Drawings

METHOD FOR INDIVISIBLY MODIFYING A PLURALITY OF SITES IN A MICROCIRCUIT CARD NON VOLATILE MEMORY, IN PARTICULAR A CONTACTLESS CARD

This application is the U.S. national phase of international application PCT/FR99/00837, filed in on 9 Apr. 1999 which designated the U.S. PCT/FR99/00837 claims priority to FR Application No. 98/04453 filed 9 Apr. 1998. The entire contents of these applications are incorporated herein by reference.

FIELD OF INVENTION

The invention relates to microcircuit cards, and more particularly to microprocessor cards which themselves perform various modifications to their own non-volatile memory.

DISCUSSION OF PRIOR ART

When executing a transaction, the memory is generally modified one or more times, and, naturally, it is necessary to ensure that all of the modifications have been performed correctly before being in a position to make use of the newly recorded information, and the newly recorded information must be ignored or erased in the event of an error or of the record suffering from corruption.

U.S. Pat. No. 4,877,945 thus describes how to detect an anomaly that occurs during a write sequence for a plurality of data items so as to prevent the transaction being continued on an erroneous basis.

In the event of an anomaly, it is also desirable to be able to return to the status quo, i.e. for a subsequent transaction to be in a position to operate on the information values that were recorded in the card before it executed the incorrect transaction.

Above-mentioned U.S. Pat. No. 4,877,945 does not offer that advantage, since in some cases the old information values will have been lost during execution of the incorrect transaction, such that it will not be possible to restore said information to its earlier state, at least not solely on the basis of information contained in the card.

WO-A-89/02140 describes one such manner of operating, but it is applicable only to the case when a single item of information has been modified or when a plurality of items are modified independently of one another.

However, in many cases, it is necessary to modify a plurality of items of information during a single transaction, and they are considered as being "mutually interdependent" when they need to be processed together to ensure that all of the modifications to the plurality of items of information have been properly executed.

The risk of an imperfect or uncompleted transaction bearing on a plurality of interdependent items of information is particularly high with cards of the "contactless" type where the boundaries of the volume within which the card can operate correctly around the terminal are not perceptible. Under such circumstances, there is a non-negligible risk of communication between the card and the terminal being interrupted unexpectedly, either because the card moves beyond the range of the terminal before the end of processing, or because of a transient disturbance, for example a mass of metal passing close by.

An example (which is naturally not limiting) is the use of such a card in a remote ticketing transaction, i.e. for access to a public transport network, where the card performs two roles: that of a travel ticket proper; and that of an electronic purse.

Several solutions have already been proposed to mitigate the above difficulties and to make a plurality of writes or other modifications to interdependent data items "indivisible".

In the particular application given above as an example, known systems begin by debiting the purse, and then they record the travel rights that have been acquired by the user. If the user withdraws the card between those two operations, then the user is invited to present the card again and the writing of travel rights is restarted. However, if the user goes away without presenting the card again, then the user will have been wronged. Clearly it is not possible to proceed in the opposite order since the user would then be tempted to withdraw the card before the purse had been debited.

That solution implies that the terminal is specially configured to make it possible, in the event of an interruption, to activate exception processing for handling the restarting of a transaction (reinserting the card in the terminal on request). In addition to making the software of the terminal more complex, that solution is not entirely satisfactory insofar, as mentioned, the user can still be wronged in the event of the transaction not being restarted.

Another solution consists in data crossing, where the terminal conserves information about the state of the purse in the card, and vice versa. However that solution is not satisfactory either since in addition to being complex, it increases the volume of data interchanged between the card and the terminal and therefore slows down execution of a transaction. It is also difficult to apply when a large number (three or more) of writes are to be made indivisible.

SUMMARY OF INVENTION

One of the objects of the invention is to propose a method enabling a plurality of modifications to be made in the memory of the card in indivisible manner.

Another object of the invention is to propose such a method which can be handled entirely by the card. The method can thus be implemented without modifying terminals and without there being any need to provide exception processing in the terminals, the method using the syntax of existing orders and thus being very flexible in the commands that can be selected.

DETAILED DESCRIPTION

The method of the invention is of the type in which the card is coupled temporarily to a terminal while a transaction is being executed, the transaction including the terminal applying to the card a plurality of modification commands, each comprising at least one operation of recording in the card memory a respective data item designated by the command, the various data items recorded in this way being mutually interdependent.

In a manner characteristic of the invention, this method comprises the execution by the card of the following steps: a) on receiving corresponding respective commands from the terminal, it modifies the contents of the card memory by provisionally recording in the card memory each of said interdependent items of information without losing prior values corresponding to said items; and then b) the modifications are finalized either by all of them being confirmed or by all of them being discarded, such that for subsequent operations, the commands executed in step a) will either all have been taken into account, or else all of them will be without effect.

The principle on which the invention is based thus consists in grouping together the plurality of modifications that are to be made in indivisible manner within a single step a) and then after the modifications have been executed, in the card validating these modifications overall. If validation is successful, then on the next operation performed by the card (whether during the same transaction or during a subsequent transaction), the accessible content will necessarily reflect the modifications that have been made.

Conversely, any interruption in the operation of the card taking place during step a) will cancel all of the modifications performed, and the data in the non-volatile memory will remain in its state prior to step a).

In a particular implementation, in the event of confirmation in step b), a flag confirming proper execution is recorded in the memory of the card; and when the card subsequently receives a command requiring at least one of the data items written in step a) or the value corresponding thereto to be read and/or modified, the card begins by examining the state of the flag, and if it has not been recorded, the card ignores or cancels the provisional recordings previously made in step a) and executes the command on the basis of said prior values corresponding to the data items. If, when the card examines the state of the flag, it is found to have been recorded, then the card can execute operations of copying the provisional writes performed in step a).

Most advantageously, the card is suitable for operating in two modes, namely: an in-session mode in which recordings are made by executing steps a) and b); and an out-of-session mode in which the making of recordings is not confirmed to all of steps a) and b).

The opening of a session can be implicit, e.g. by the card being reset to zero, or it can follow a command having two actions, executing a predetermined operation and being interpreted as an order to open a session.

For example, when a normally-certified recording is not accompanied by a certificate, the card automatically opens a session which processes recording in this session.

In the same manner, closure of a session can be implicit, following a command that performs two actions: executing a predetermined operation and being interpreted as an order to close a session.

For example, an operation of debiting the purse closes the session, thereby also avoiding any need to defer communication of the resulting certificate and making it possible for session certificates and purse transaction certificates to be indistinguishable.

Most advantageously, the method comprises an authentication function combined with the function of finalizing step b), forcing step b) to be discarded in the event of authentication failing.

In a first implementation, said authentication is performed by the card which authenticates the terminal and/or the data interchanged between the terminal and the card, the card checking a cryptographic certificate produced by the terminal and transmitted to the card, and confirming the modifications in step b) only if the certificate is recognized as being correct.

In a mode with a session, provision can be made, so that when the card receives from the terminal commands for modifying the content of the memory and including verification of a cryptographic certificate, said verification is performed if the command is received out-of-session, and it is not performed if the command is received in-session.

In other words, those of the commands that are executed by the card in step b) and that would normally (i.e. out-of-session) verify a cryptographic certificate, no longer include this verification when they are executed in-session, with the "session certificate authenticating the terminal" performing an equivalent function.

In a second implementation, said authentication is performed by the terminal which authenticates the card and/or the data interchanged between the terminal and the card, the card producing and transmitting a cryptographic certificate in conditional manner to the terminal, if and only if the modifications have been confirmed in step b).

In a mode with a session, provision can be made so that when the card receives from the terminal commands for modifying the contents of the memory and including the production of a cryptographic certificate, said production is performed if the command is received out-of-session, and is not performed if the command is received in-session.

In other words, those of the commands that are executed by the card in step b) and that would normally (i.e. out-of-session) produce a cryptographic certificate, no longer produce such a certificate when they are executed in-session, with the "session certificate authenticating the terminal" performing an equivalent function.

Provision can also be made so that when the card receives from the terminal in step b) commands for modifying the contents of the memory and including the production of a plurality of cryptographic certificates, these certificates are stored in step b), and then transmitted together to the terminal if, and only if, the modifications have been confirmed in step b).

In other words, provision is made to defer communication by the card of cryptographic certificates normally produced by the orders of step b). In particular, if a certified write command produces a certain write certificate, it is desirable for the certificate to leave the card only after the write has been performed irrevocably.

In a particular implementation, at least some of the commands that may be executed in step b) include an optional inhibit attribute, and if the card executes such a command in-session in a step b), the modifications performed by said command take effect independently of the result of step b).

In other words, the attribute defines whether the command is performed in-session (i.e. will be cancelled if the session is not closed) or out-of-session (i.e. is immediately effective as though it had been performed out-of-session, even if chronologically speaking it is in-session).

Most advantageously, the invention further provides, after step b) and in the event of modifications being confirmed, the following sequence of steps: d) the terminal executes an action following confirmation by the card; and e) in the event of said action being properly performed by the terminal, ratification information is recorded in the card suitable for subsequent accessing by reading.

Such "ratification" of the session informs the card that the terminal has indeed been able to take decisions (e.g. opening a barrier in an application to giving access to a public transport network) following execution of the session.

It will be observed that this ratification is handled by the card without needing an additional write (the copying of provisional writes being an operation which in any event must be performed sooner or later). In addition, this copying is performed at the card end only on condition that the action has been properly executed at the terminal end, i.e. only if the entire transaction is consistent.

With all of the operations being handled by the card, provision can advantageously be made for the recording command of step e) to be an implicit command, any command received by the card after step b) being interpreted as an order for recording ratification information in the card.

Other characteristics and advantages appear from the following description of two implementations of the invention.

In these examples, and indeed throughout the text, the word "designate" is used in its sense of "specify one of a plurality", and relates to the action which consists in characterizing a particular item of information amongst the various items contained in the card.

Such designation can be implicit because the command itself specifies a particular item of information; for example the command "debit the amount x from the purse" designates the memory location that contains the value of the "purse balance" data item.

Designation can also be explicit, as for example in Example I below, where provision is made for write commands to have an address or a sector identifier, with the commands being indexed by an index i.

EXAMPLE I

A card is provided that stores 100 8-byte values, and capable of performing the following orders:
  reading an 8-byte value v as specified by an index i in the range 1 to 100;
  writing an 8-byte value v as specified by an index i in the range 1 to 100;
  opening a session;
  closing a session.

The card must allow up to three writes within a single session. By convention, upper case letters are used to designate values in non-volatile memory (e.g. EEPROM) and lower case letters are used to designate values in volatile memory (RAM, whose contents is lost when not powered).

A non-volatile memory zone is allocated to main data storage of the card (definitive writes):
  V[i], for i in the range 1 to 100: 100×8 bytes.

Another non-volatile memory zone is allocated to the session mechanism, and comprises:
  T[k], for j in the range 1 to 3: 3×8 bytes containing the values written during the session (provisional writes);
  I[k], for j in the range 1 to 3: 3×1 byte containing the indices of the values written during the session; and
  C: a count byte that is written at the end of the session. C encodes the number of writes performed in the session; an appropriate redundancy mechanism (e.g. associating the complement of said value) makes it possible to detect the case where the value stored in said count byte is uncertain.

The operations take places as follows.

Step 0: at a moment between the card being powered and the first command being performed, C is examined. If it is a value that is certain in the range 1 to 3, then for k equals 1 to C the value T[k] at index I[k] is copied from the table V[i]. Thereafter, C is reset to zero and an internal variable j is set to −1 (to indicate that a session is not open).

Step 1: on reading, a test is made to see whether j>0; if yes, the requested index i is compared with the values of I[k] for k from j to 1 in decreasing order. If there is a match, T[k] is returned. In all other cases, V[i] is returned.

Step 2: on opening a session, j is initialized to 0 (if a session is already open, it is cancelled).

Step 3: on each write, if j=−1 (session not open), the communicated value v is written in T[0], the communicated index i is written in I[0], and then C=1 is written, after which v is written in V[i], and C=0 is written; if 0≦j<3 (writing in a session), j is increased by 1, v is written in T[j], and i is written in I[j]; if j=3 the operation is refused (the limit on writes in a session has been exceeded).

Step 4: on closing a session, if j>0, j is written in C, and then for j from 1 to C, the value T[j] at index I[j] of the table V[ ] is copied. Then C is set to 0, and j to −1.

It is shown that the power supply of the card can be interrupted at any moment and that the values read will be correct, i.e. for each index i the last value written not in a session, or written in a session that has been closed (writing has been completed or a session has been closed at the time a non-zero value is written in C).

Cryptography is added to prevent certain operations if a cryptographic certificate supplied to the card is incorrect, and/or causing cryptographic certificates to be produced to the card at the end of certain operations.

The cryptographic certificates used are based on a known type of cryptography. For example, the "session certificate authenticating the card" (or the terminal) is obtained by applying the secure hash algorithm (SHA) at the card end and at the terminal end to data supplied by the card (or the terminal) and to a random number supplied by the terminal (or the card) when the session is opened; the message authentication code (MAC) that results therefrom is signed by the card (or the terminal) by the digital signature algorithm (DSA) using a secret key contained in the card (or the terminal); the terminal (or the card) verifies the signature using a public key. A symmetrical cryptographic algorithm such as the data encryption standard (DES) can also be used for producing the MAC and/or generating signatures.

In an option of the invention, the step of producing the MAC is common in both directions of authentication, and bears on all of the data of the session. When using symmetrical cryptography, the certificate authenticating the card and the certificate authenticating the terminal are obtained by a single step of MAC enciphering, with the respective certificates for the card and the terminal being derived therefrom by an elementary operation such as extracting certain predetermined bits.

EXAMPLE II

In this example, the data of the memory is organized as sectors, each sector comprising four fields:
  1. data;
  2. an identifier (an access key enabling a sector to be selected);
  3. pertinence: for determining which sector is pertinent if two segments have the same identifier; and
  4. check: for verifying that the three preceding fields are not corrupt (e.g. by performing a parity type check).

A sector is designated by its identifier, with this notion replacing that of an address. The procedure for writing in a sector has an identifier as a parameter together with the data for association with that identifier. The procedure for reading a sector has an identifier as its parameter, and it returns the data that was associated with the identifier on the last occasion a write was performed using that identifier (or an appropriate indication if the identifier has never been used before). In other words, an associative type of access is implemented instead of indexed access.

During the procedure of reading a sector, the card searches for sectors having identifiers containing the requested value, and which are not corrupt (as determined by the check field). When a plurality of sectors satisfy these two criteria, a particular sector is retained on the basis of the pertinence field.

When writing a sector, the card writes the following in an available sector: the requested data; the identifier; a pertinence field such that, for the read procedure, this sector will be the most pertinent of non-corrupt sectors possessing this identifier; and a check field matching the three preceding fields (in other words, writing is handled in such a manner that a subsequent read can take place properly).

Advantageously, the write procedure is followed by erasing the sector that has been made non-pertinent by the new sector being written, thus making a new sector available.

Advantageously, an (additional) garbage collection type system is also provided, i.e. a system for recovering sectors that are not useful, either because they are corrupt or because they are not pertinent.

Advantageously, a system is provided which spreads out the wear that results from writing by ensuring that it is not always the same sectors that are used, e.g. by selecting a sector randomly from amongst the sectors that are available.

A generally advantageous variant of the procedure for searching for a sector consists in taking advantage of the search step to erase sectors that are found to be corrupt and/or sectors that are not the most pertinent, thereby recreating free sectors (that wastes time during a particular read, in favor of speed for subsequent reads and writes). Advantageously, prior to erasing a sector which has been found to be non-corrupt, but not pertinent, the pertinent sector is written again since it may have been written improperly.

The working size of the memory is equal to the number of available sectors, minus one sector which must remain erased. All of the sectors (including the erased sector) are distributed dynamically within the memory.

If the data is to be structured in files, e.g. in application of the ISO/IEC 7816-4 standard, then the sector identifier is subdivided into two subfields: a file identifier; and an identifier for a sector within the file.

A non-limiting implementation of read/write operations using this particular sector structure is given below:

There follows a description of a (non-limiting) implementation of read/write operations using this particular sector structure:

The check field contains in binary code the number of zero bits in the other three fields; it has been shown that if a problem such as an interrupted write or erase modifies any number of bits in the sector all in the same direction, then checking the value of the check field can always detect that the problem has occurred.

The pertinence field is an integer in the range 0 to 3 encoded on 2 bits.

The read procedure reads all of the sectors sequentially until it finds a first sector possessing the looked-for identifier and that is not corrupt. If no sector is found, then the procedure ends with a "sector not found" report. If a first such sector is found, its position is stored together with its data and its pertinence p. The search is continued. If a second sector is found possessing the looked-for identifier and that is not corrupt, it is tested whether its pertinence q is the remainder of integer division of p+1 by 3; if "yes", then the second sector is rewritten, the first sector is erased, and the data from the second sector is returned; otherwise, the first sector is rewritten, the second sector is erased, and data is returned from the first. If a second sector is not found and if the pertinence of the first sector is p=3, then this sector is erased and a "sector not found" report is given; otherwise the data returned comes from the first found sector.

The write procedure begins like the above read procedure. If a previously-stored sector is found that would have been returned by the read procedure for the given identifier, the position of this sector is retained together with its pertinence p (which is equal to 0, 1, or 2); if no such sector is found, then a free sector is selected (using the procedure described below) and the identifier, data, pertinence p=3, and check fields are written to said sector, and the position and the pertinence of said sector is retained. In both cases, the procedure continues by selecting a free sector (using the procedure described below). The identifier, data, pertinence q (calculated as the remainder of integer division of p+1 by 3), and check fields are written to this sector. Thereafter the previously-stored sector, if any, is erased.

To look for a free sector, the number n of found free sectors is initialized at zero. The sectors are examined in sequence. For each sector that is not empty and that is corrupt, the sector is erased so that it becomes empty (thus contributing to the above-mentioned garbage collection); if the sector is not corrupt and if its pertinence is p=3, it is erased (also contributing to garbage collection); if the sector is not corrupt and if its pertinence is not p=3, then the zone that has not yet been scanned is searched for another non-corrupt sector having the same identifier, and if one is found, the non-pertinent sector is erased, proceeding as for reading; if at the end of this process the sector is empty, the number n of found free sectors is incremented, and a random integer is drawn in the range 0 to n−1; if the integer is 0, the position of the empty sector is stored. When all of the sectors have been scanned, all non-empty sectors are not corrupt, no two sectors have the same identifier, the number n of empty sectors is known, and one of them has been stored as a random choice made in equiprobable manner. If no free sector is found, the write procedure is interrupted.

The way in which the card can handle indivisible modification sessions using such a particular sector structure is described below.

To store indivisible modifications, the card has N erased sectors available in non-volatile memory (where N corresponds to the number of indivisible modifications that might need to be made during a single session). In addition, the card handles a non-volatile memory zone (not included in the sectors) that is dedicated to handling a session and that is referred to as the "session descriptor".

This implementation has no authentication specific to a session.

A session descriptor is defined on three fields:

a list of references to indivisible sectors (LRSA);

a check value on creating the list of references to indivisible sectors (VCC); and a check value taking account of the list of references to indivisible sectors (VCPC), for discovering whether or not a session has been closed).

Step 0: initialization: before first access to data since the most recent interruption of card operation, e.g. on a reset, the card must ensure that the session descriptor is erased. Several cases need to be taken into consideration, depending on the state of the session descriptor:

it is completely erased: the card leaves it unchanged;

it is not completely erased, and the VCPC is correct: the card searches for and erases (where necessary) all of the sectors made obsolete by those that have been written (from those referenced in the list), and then it erases the session descriptor;

it is not completely erased, the VCPC is erased or incorrect, and the VCC is correct: the card erases the sectors given in the LRSA and then it erases the session descriptor; or it is not completely erased, the VCPC is erased or incorrect and the VCC is erased or incorrect: the card erases the session descriptor.

Step 1: opening a session: the card looks for N erased sectors and then records the list of references thereto in its VCC in the session descriptor (assumed to be erased).

Step 2: session in progress: the card receives commands. When one of them gives rise to one or more indivisible modifications, the sectors used for recording these modifications are those recorded in the LRSA, up to a total of N modified sectors.

Step 3: closing a session: to close a session, the card writes the VCPC which ensures that the LRSA and its VCC have been taken into account. Thereafter it searches for and erases all of the sectors that have been made obsolete by those that it has written (from those referenced in the list). Thereafter, it erases the session descriptor.

In addition, if it is the card that handles ratification, session handling includes the following modifications:

Step 0: initialization: in the event that the session descriptor is not completely erased and the VCPC is correct, the card looks for and erases (where necessary) all of the sectors made obsolete by those that had been written (from those referenced in the list), but it does not erase the session descriptor.

Step 1: opening a session: the card records in volatile memory that a session is open. If the session descriptor is not empty, the card indicates that the preceding session has not been ratified and, by analyzing the LRSA, it can even indicate which data items have not been ratified. In any event, it does not modify the session descriptor.

Step 2: session in progress: during the first command with indivisible modifications, the card erases the session descriptor if necessary, searches for N erased sectors, and then writes the LRSA and its VCC.

Step 3: closing a session: the card records in volatile memory that no session is open. Whatever happens, it does not erase the session descriptor.

The invention claimed is:

1. A method of modifying the content of the non-volatile memory of a contactless microcircuit card, wherein the card is temporarily coupled to a terminal while a transaction is being executed, in particular a remote ticketing transaction, the transaction including the terminal applying to the card a plurality of modification commands, each command comprising at least one operation of recording in the card memory a respective data item designated by the command, the various data items recorded in this way being mutually interdependent, said method comprising the card executing the steps of:
   a) on receiving corresponding respective commands from the terminal, modifying the contents of the card memory by provisionally recording in the card memory each of said interdependent items of information without losing prior values corresponding to said items; and
   b) finalizing the modifications to the card memory by one of confirming all of the modifications and by discarding all of the modifications, wherein for subsequent operations, the commands executed in step a) will either all have been taken into account, or else all of them will be without effect.

2. The method of claim 1, wherein:
   in step b), a flag confirming proper execution is recorded in the memory of the card; and
   when the card subsequently receives a command requiring at least one of the data items written in step a) or the value corresponding thereto to be read and/or modified, the card begins by examining the state of the flag, and if it has not been recorded, the card ignores or cancels the provisional recordings previously made in step a) and executes the command on the basis of said prior values corresponding to the data items.

3. The method of claim 2, wherein, when the card examines the state of the flag, and if the flag has been recorded, the card executes operations for copying the provisional writes made in step a).

4. The method of claim 1, in which the card is suitable for operating in two modes, namely:
   an in-session mode in which recordings are made by executing steps a) and b); and
   an out-of session mode in which the making of recordings is not confirmed to all of steps a) and b).

5. The method of claim 4, wherein when the card receives from the terminal commands for modifying the content of the memory and including verification of a cryptographic certificate, said verification is performed if the command is received out-of-session, and it is not performed if the command is received in-session, wherein said authentication is performed by the card which authenticates the terminal and/or the data interchanged between the terminal and the card, the card checking a cryptographic certificate produced by the terminal and transmitted to the card, and confirming the modifications in step b) only if the certificate is recognized as being correct.

6. The method of claim 4, wherein said authentication is performed by the terminal which authenticates the card and/or the data interchanged between the terminal and the card, the card producing and transmitting a cryptographic certificate in conditional manner to the terminal, if and only if the modifications have been confirmed in step b), wherein when the card receives from the terminal commands for modifying the contents of the memory and including the production of a cryptographic certificate, said production is performed if the command is received out-of-session, and is not performed if the command is received in-session.

7. The method of claim 4 taken in combination, in which at least some of the commands that may be executed in step b) include an optional inhibit attribute, and in which, if the card executes such a command in-session in a step b), the modifications performed by said command take effect independently of the result of step b).

8. The method of claim 1, comprising an authentication function combined with the function of finalizing step b), forcing step b) to be discarded in the event of authentication failing.

9. The method of claim 8, in which said authentication is performed by the card which authenticates the terminal and/or the data interchanged between the terminal and the card, the card checking a cryptographic certificate produced by the terminal and transmitted to the card, and confirming the modifications in step b) only if the certificate is recognized as being correct.

10. The method of claim 8, in which said authentication is performed by the terminal which authenticates the card and/or the data interchanged between the terminal and the card, the card producing and transmitting a cryptographic certificate in conditional manner to the terminal, if and only if the modifications have been confirmed in step b).

11. The method of claim 1, in which, when the card receives from the terminal in step b) commands for modifying the contents of the memory and including the production of a plurality of cryptographic certificates, these certificates are stored in step b), and then transmitted together to the terminal if, and only if the modifications have been confirmed in step b).

12. The method of claim 1, in which provision is further made, after step b) and in the event of modifications being confirmed, for the following sequence of steps to be performed:
  d) the terminal executes an action following confirmation by the card; and
  e) in the event of said action being properly performed by the terminal, ratification information is recorded in the card suitable for subsequent accessing by reading.

13. The method of claim 12, in which the recording command of step e) is an implicit command, any command received by the card after step b) being interpreted as an order for recording ratification information in the card.

14. The method of claim 1, wherein after said modifying step (a) and prior to said finalizing step (b), any interruption in operation of the card results in the cancellation of the modifications in the modifying step (a) and return of the values of the interdependent items of information of the card memory to their prior values.

15. The method of claim 14, wherein the cancellation step occurs when the card is next coupled to a terminal.

16. A method of modifying the content of the non-volatile memory of a microcircuit card, in particular a contactless card, in which method the card is temporarily coupled to a terminal while a transaction is being executed, in particular a remote ticketing transaction, said transaction including the terminal applying to the card a plurality of modification commands, each of said modification command comprising at least one operation of recording in the card memory a particular data item, determined among a plurality of data items contained in the card as a function of an index or of an identifier conveyed to the card by each of said commands, the various data items recorded in this way being mutually interdependent, the method comprising the card executing the following steps:
  a) on receiving corresponding respective commands from the terminal, provisionally recording in the card memory each of said interdependent items of information; then
  b) finalizing such modifications such that for subsequent operations the commands executed in step a) will:
    i) either all have been taken into account,
    ii) or else all them will be without effect,
  in which method:
  said commands are commands for modification of the contents of the card memory,
  in step a) the writing in the card memory of new values of said data items modifies the contents of the memory without losing prior values of said items, and
  in step b), the modifications are finalized in such a way that, if all the commands performed in step a) are without effect, then the data contained in the non-volatile memory will remain the state they were before step b) being performed.

17. The method of claim 16, in which:
  in the event of confirmation in step b), a flag confirming proper execution is recorded in the memory of the card; and
  when the card subsequently receives a command requiring at least one of the data items written in step a) or the value corresponding thereto to be read and/or modified, the card begins by examining the state of the flag, and if it has not been recorded, the card ignores or cancels the provisional recordings previously made in step a) and executes the command on the basis of said prior values corresponding to the data items.

18. The method of claim 17, in which, when the card examines the state of the flag, and if the flag has been recorded, the card executes operations for copying the provisional writes made in step a).

19. The method of claim 16, in which the card is suitable for operating in two modes, namely:
  an in-session mode in which recordings are made by executing steps a) and b); and
  an out-of-session mode in which the making of recordings is not confirmed to all of steps a) and b).

20. The method of claim 19, in which, when the card receives from the terminal commands for modifying the content of the memory and including verification of a cryptographic certificate, said verification is performed if the command is received out-of-session, and it is not performed if the command is received in-session.

21. The method of claim 19, in which, when the card receives from the terminal commands for modifying the contents of the memory and including the production of a cryptographic certificate, said production is performed if the command is received out-of-session, and is not performed if the command is received in-session.

22. The method of claim 19, in which, when the card receives from the terminal in step b) commands for modifying the contents of the memory and including the production of a plurality of cryptographic certificates, these certificates are stored in step b), and then transmitted together to the terminal if, and only if the modifications have been confirmed in step b).

23. The method of claim 19, in which at least some of the commands includes an inhibit attribute, and in which, if the card executes such a command, the modifications performed by said command take effect independently of the result of step b).

24. The method of claim 19, in which provision is further made, after step b) and in the event of modifications being confirmed, for the following sequence of steps to be performed:
  d) the terminal executes an action following confirmation by the card; and
  e) in the event of said action being properly performed by the terminal, ratification information is recorded in the card suitable for subsequent accessing by reading.

25. The method of claim 24, in which the recording command of step e) is an implicit command, any command received by the card after step b) being interpreted as an order for recording ratification information in the card.

26. The method of claim 19, in which after performing at least one of said modifications in step a) which is not followed by a finalization by a step b) occurring thereafter, in case of later re-initialization of the card provision is made of a preliminary step infirming all modifications thus performed, such that for any following operations all commands performed in step a) be without effect.

27. The method of claim 16, comprising an authentication function combined with the function of finalizing step b), forcing step b) to be discarded in the event of authentication failing.

28. The method of claim 27, in which said authentication is performed by the card which authenticates the terminal and/or the data interchanged between the terminal and the card, the card checking a cryptographic certificate produced by the terminal and transmitted to the card, and confirming the modifications in step b) only if the certificate is recognized as being correct.

29. The method of claim 27, in which said authentication is performed by the terminal which authenticates the card and/or the data interchanged between the terminal and the card, the card producing and transmitting a cryptographic certificate in conditional manner to the terminal, if and only if the modifications have been confirmed in step b).

* * * * *